United States Patent [19]

Lamb et al.

[11] 4,253,304
[45] Mar. 3, 1981

[54] THERMAL ELEMENT

[75] Inventors: W. Doyle Lamb; Lawrence F. Luckenbill, both of Decatur, Ill.

[73] Assignee: A. W. Cash Valve Manufacturing Corporation, Decatur, Ill.

[21] Appl. No.: 918,603

[22] Filed: Jun. 23, 1978

[51] Int. Cl.³ .............................................. F03G 7/06
[52] U.S. Cl. ................................... 60/527; 73/368.3; 236/99 K; 337/394
[58] Field of Search ................ 60/527, 528, 530, 531; 236/99 R, 99 K, 101 R; 337/114, 119, 120, 382, 393, 394; 73/363, 368, 368.3

[56] References Cited

U.S. PATENT DOCUMENTS

| 3,007,029 | 10/1961 | Levine | 60/530 |
|---|---|---|---|
| 3,302,391 | 2/1967 | Mihm | 60/527 |
| 3,357,252 | 12/1967 | Vernet | 73/368.3 |
| 3,427,883 | 2/1969 | Kuze | 73/368.3 |
| 3,529,770 | 9/1970 | Moody | 236/100 |
| 3,686,857 | 8/1972 | Berg | 73/368.3 X |
| 3,777,495 | 12/1973 | Kuze | 60/530 |

FOREIGN PATENT DOCUMENTS 696748  10/1964  Canada .................................... 337/393

Primary Examiner—Allen M. Ostrager
Assistant Examiner—Stephen F. Husar
Attorney, Agent, or Firm—Wegner, Stellman, McCord, Wood & Dalton

[57] ABSTRACT

A thermal element having a tubular casing with an open end, a volume of heat-responsive, expandable wax positioned in said casing at a distance from the open end thereof, a spherical resilient seal member compressively positioned in the casing adjacent said wax, a motion-transmitting pin extended between the seal member and the open end of the casing and having a relatively soft washer affixed thereto for engagement against the seal member and with at least one peripheral notch in the washer permitting flow of liquid thereacross.

8 Claims, 4 Drawing Figures

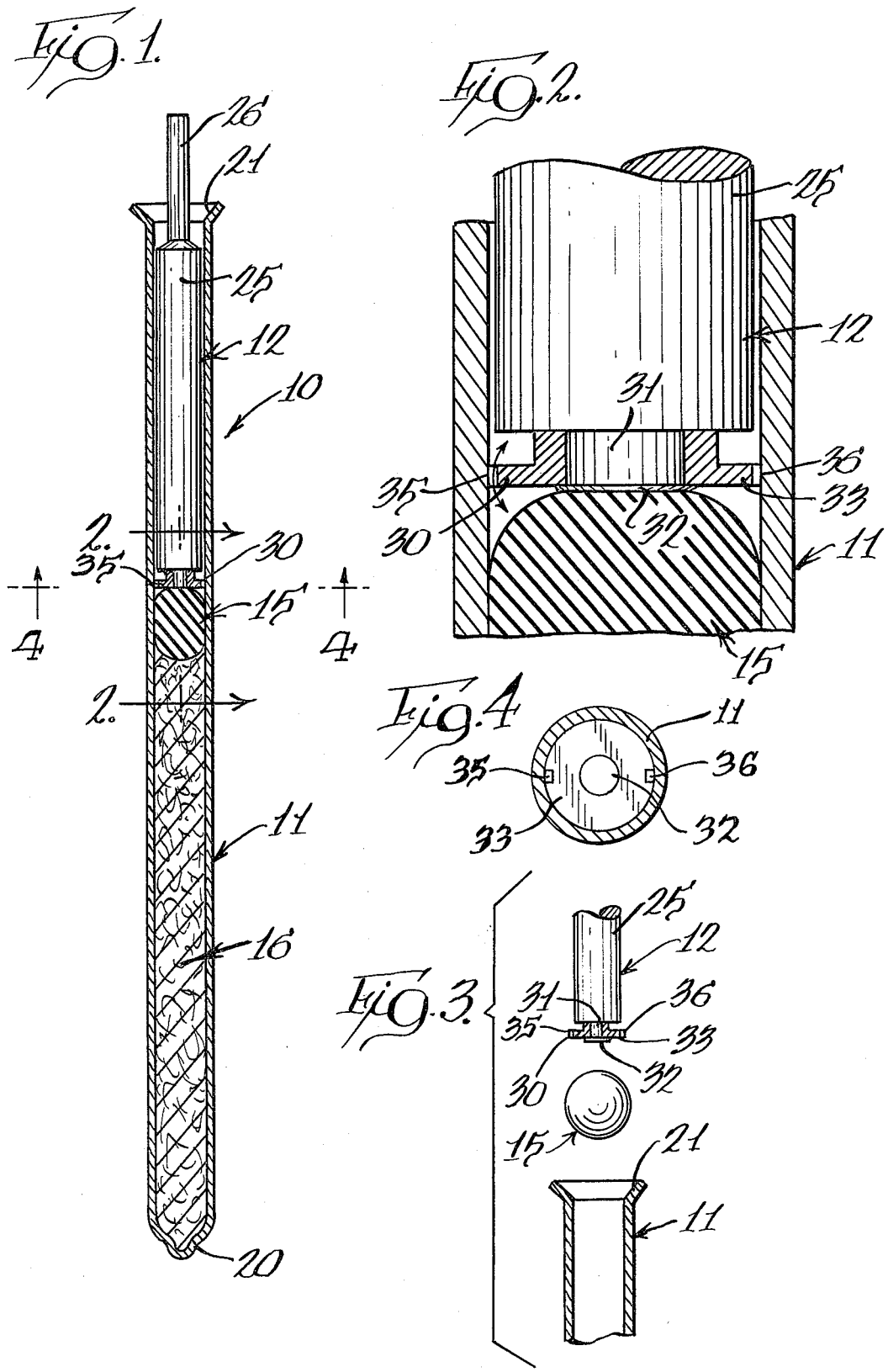

THERMAL ELEMENT

BACKGROUND OF THE INVENTION

This invention pertains to heat-responsive thermal elements usable for actuation of devices such as fluid control valves which are responsive to temperature of the fluid.

For many years, various types of control devices which are temperature-responsive have been operated by a thermal element. The thermal element has a casing carrying a charge or volume of material expandable in response to heating thereof with such material typically being a wax material. The thermal element also has motion-transmitting means for transmitting the force created by the heat-expandable wax to a member to be operated, such as the valve member of a fluid valve such as a relief valve and also structure to form an interface between the wax material and the motion-transmitting means. Such interfaces have typically utilized either O-rings or other forms of hollow cylindrical seals. Such prior devices have required some structural part to impart a radially outwardly force to form a seal with the casing of the thermal element.

Some of the prior art thermal elements have attempted to prevent flow of a part of the controlled fluid to a location between the motion-transmitting structure and the sealing structure which imposes additional design requirements for the thermal element.

SUMMARY OF THE INVENTION

A primary feature of the invention disclosed herein is to provide a thermal element of new and improved construction having a minimal number of components in a pencil-thin, relatively short package, which develops more load and which is designed for fully automatic assembly.

In carrying out the foregoing, an object of the invention is to provide a thermal element having a tubular casing with an open end with a volume of heat-responsive, expandable material positioned in the casing, a spherical resilient seal member compressively positioned in the casing adjacent the material and a motion-transmitting pin extended between the seal member and the open end of the casing.

An additional object of the invention is to provide a thermal element as defined in the preceding paragraph wherein the pin is loosely fitted within the tubular casing and has a washer of relatively soft material attached to an end thereof for engagement against the seal member to prevent extrusion of the seal member in the space between the pin and the tubular casing and snugly fit the interior of the casing and hold the pin against inadvertent movement.

Still another object of the invention is to provide a thermal element as defined in the preceding paragraphs wherein the washer is an annular member fitted on a reduced diameter section of the pin and secured by an integral part of the pin and with the washer having means, preferably in the form of at least one notch on the periphery thereof, to prevent entrapment between the washer and the seal member.

Still another object of the invention is to provide a thermal element as defined in the preceding paragraphs wherein the spherical resilient sealed member is formed as a ball of soft material, such as silicone rubber or the like, and having a diameter greater than the internal diameter of the tubular casing for compressive deformation to seal against the interior of the casing while being movable axially thereof as the heat-expandable material expands and contracts.

Still another object of the invention is to provide a thermal element having the structure as set forth in the preceding paragraphs which is capable of simple assembly, wherein the tubular casing is formed of stainless steel that may be formed to the desired dimensions and the motion-transmitting pin is suitably formed of metal or plastic with a reduced diameter end to receive the annular washer thereon with the pin end burnished over the washer to retain it in association with the pin and at the same time the washer is notched at the periphery to provide for said flow of liquid therepast in operation. The washer has a snug fit with the tubular casing whereby once the pin and washer are assembled into the casing the parts may be easily transported and positioned in different ways without any separation of the parts and with the pin being free of contact of the tubular casing whereby no close tolerances between the pin and interior of the tubular casing are required.

BRIEF DESCRIPTION OF THE DRAWING

FIG. 1 is a central vertical section of the thermal element;

FIG. 2 is a fragmentary vertical section, on an enlarged scale and taken along the lines 2—2 in FIG. 1; and FIG. 3 is a fragmentary exploded view showing several components of the thermal element.

FIG. 4 is a horizontal section, taken along the lines 4—4 in FIG. 1.

DESCRIPTION OF THE PREFERRED EMBODIMENT

The thermal element is shown in assembled relation in FIG. 1 and identified generally at 10. The thermal element has four primary parts including a tubular casing indicated generally at 11, a motion-transmitting pin indicated generally at 12, a resilient seal member indicated generally at 15, and heat-expandable material 16, preferably in the form of a commercially available wax.

The tubular casing 11 is formed from metal, such as copper or thin wall stainless steel, with the latter being preferred, and has a closed end 20 and an open end 21. The stainless steel has relatively high strength and, therefore, the tubular casing can be made of a thinner wall than copper to provide for a larger internal diameter in the same size thermal element to provide for a greater cross section of the heat-expandable material 16. This can provide greater axial forces and loads with the same pressure of the heat-expandable wax 16. With the greater force or load provided with this construction, the thermal element is somewhat less load sensitive when used in a structure, such as a relief valve and which has to overcome a preset closing pressure on the valve member that is to be opened by the thermal element upon expansion of the heat-expandable material. Although stainless steel is considered difficult to form because it work hardens, a two-step roll-forming method is used to very effectively close the end 20 of the tubular casing with the final sealing of it by use of Tungsten Inert Gas welding.

The heat-expandable material 16 is preferably in the form of a commercially available wax and has a working range of 195°–217° F., i.e., a transition point at 195° F. At this temperature it starts to turn from a hard and brittle solid to a plastic-like substance and expansion begins. At 217° F., it starts turning to a liquid and expansion is considerably slowed.

After forming of the tubular casing 11, as described above, the next step is to fill the tubular casing with liquid wax at some temperature between 230° F. and 260° F. followed by a ramming at 190° F. The ramming is required to remove solid wax from the wall of the tubular casing and to create a uniform wax length within the tube.

The resilient seal member 15 is a spherical or ball-shaped member of relatively soft silicone rubber selected to provide optimum performance at temperatures encountered. For example, the temperatures encountered in a valve application could be 140° F. to 180° F. with higher test temperatures. The rubber ball 15 has a diameter greater than the internal diameter of the tubular casing 11, as shown in FIG. 3, and is positioned by squeezing into the bore of the tubular casing. Its shape permits considerable stored energy or memory and the ball does not have to be oriented for assembly or for proper function inside the element. In addition, the ball provides more latitude in dimensional control, without losing sealing capability or creating excessive sidewall pressure. Additionally, it has been found that the ball seals very well over an internal weld seam in the tubular casing if the tubular casing is made with a raised weld seam.

After placing of the wax within the tubular casing, as described above, the tube is evacuated by applying a vacuum and the seal member 15 is inserted within the casing against the upper level of the wax 16.

The motion-transmitting pin 12 is a cylindrical member and of a diameter less than the internal diameter of the tubular casing 11 in order that the major part 25 of the pin has a loose fit therein. This enables free movement of the pin relative to the tubular casing.

The pin has an upper end 26 of reduced diameter extending beyond the open end 21 of the casing for engagement with a structure, such as the structure associated with the valve member causing opening thereof as the pin 12 moves upwardly, as viewed in FIG. 1.

An annular washer 30 of relatively soft material is fitted on a reduced diameter lower end 31 of the pin 12 and held thereto by a flattened section 32 of the pin formed as by burnishing whereby the washer 30 moves with the pin. This washer has a snug fit within the tubular casing 11 to prevent inadvertent fall-out of the pin from the casing if the casing is inverted and also to prevent extrusion of the seal member 15 into the space between the pin section 25 and the interior of the tubular casing.

The washer 30 has an annular groove formed, as by machining for example, to provide a relatively thin flexible section 33 for contact with the tubular casing. This reduction in contact width of the washer enables flexing thereof and greater tolerances for the washer and tubular casing without undue sliding friction therebetween.

As shown particularly in FIG. 2, the washer section 33 has a pair of notches 35 and 36 at the periphery thereof to prevent the washer from forming a fluid seal with the tube. With the notches 35 and 36 in the washer, a leak path for flow of liquid across the washer in both directions is provided to avoid trapping of liquid, rather than trying to prevent leakage past the washer. Without the notches, it would be possible for a condition to exist where the pin 12 would extend out from the casing 11 a distance sufficient to space the washer 30 from the seal member 15. Over an extended period of time, water under pressure could seep into said space. When the wax 16 expands rapidly, this water would be trapped and act as a solid fill.

In design of the motion-transmitting pin 12, the pin must be of sufficient strength to withstand some small amount of bending and the tensile loads developed by loads in the valve, such as a spring load which resists opening of the valve member. Preferably, this pin is of brass, although stainless steel and certain plastics could be used. In forming of the pin, the pin is machined to the configuration shown and the washer 30 is installed with the flattened end being formed by burnishing in the machine which machines the pins and at the same time the notches 35 and 36 are formed in the washer. The washer is also machined to form the flexible section 33. The assembled pin is then placed within the tubular casing and is retained in position during additional handling of the thermal element by the snug fit between the annular washer 30 and the tubular casing.

Use of plastics for the pin 12 would enable the pin and washer to be a one-piece molded or machined part.

The thermal element disclosed herein results in an extremely simple structure having the four primary elements and without requiring springs and plugs and extra plastic spacers. The disclosed thermal element results in reduced assembly time and costs. The use of the spherical seal member 15 avoids the requirement for some additional part of the unit to impart radially outward forces on an O-ring for example in order to impart a side wall squeeze against the tubular casing. The notched washer 30 permits leakage therepast with no adverse effects on operation of the unit since the leakage fluid can flow across the washer. Alternatively, the washer can be formed of a hexagonal or octagonal shape to provide the same functional results as the annular, notched washer.

We claim:

1. A heat-responsive thermal element comprising four parts including a tubular casing having an open end, a volume of heat-responsive expandable material positioned in said casing at a distance from the open end thereof, a motion-transmitting pin within the casing and having a portion thereof extending through the open end of the casing, and a generally spherical resilient seal member compressively positioned with random orientation in said casing between said material and said pin and free of connection to said pin for freedom of positioning and orientation to maintain a seal with said tubular casing, said seal member defining in each adjusted position an annular zone of maximum sealing force engagement with said casing substantially about the center of the seal member.

2. A thermal element as defined in claim 1 wherein said resilient seal member is a ball of soft material such as silicone rubber or the like and has a diameter greater than the internal diameter of the tubular casing for compressive deformation to seal against the interior of the tubular casing while being movable axially in the tubular casing as said material expands and contracts.

3. A heat-responsive thermal element comprising:
four parts including a tubular casing having an open end, a volume of heat-responsive expandable material positioned in said casing at a distance from the open end thereof, a motion-transmitting pin within the casing and having a portion thereof extending through the open end of the casing, and a generally spherical resilient seal member compressively positioned in said casing between said material and said pin and free of connection to said pin for freedom of adjustment to maintain a seal with said tubular casing; and a washer secured to an end of the pin adjacent said seal member and having provision for flow of liquid therepast.

4. A thermal element as defined in claim 3 wherein said pin has a loose fit in said tubular casing and said washer is of a relatively soft material and has a flexible section providing a snug fit in said tubular casing.

5. A thermal element as defined in claim 3 wherein said washer has at least one notch at the periphery thereof to provide for said flow of liquid therepast.

6. A thermal element as defined in claim 3 wherein said washer is an annular member of relatively soft material, said pin has a reduced diameter lower end for mounting of said washer and said lower end is flattened to provide a retaining flange for said washer.

7. A heat-responsive thermal element comprising a tubular casing having a closed end and an open end, a volume of heat-responsive expandable wax positioned in said tubular casing adjacent the closed end thereof, a spherical resilient seal member of silicone rubber or the like having a diameter greater than the internal diameter of the tubular casing positioned in the casing against the wax and in compressive engagement with said casing, a motion-transmitting pin loosely positioned in said casing and engageable with the seal member, and a plastic washer fastened to the inner end of the pin and having a flexible section snugly fitting the casing and having means providing a liquid leak path across the washer.

8. A thermal element as defined in claim 7 wherein the means providing a leak path across the washer comprises at least one notch on the periphery of the washer.

* * * * *